(12) United States Patent
Husain et al.

(10) Patent No.: US 8,815,085 B2
(45) Date of Patent: Aug. 26, 2014

(54) PROCESS FOR REDUCING THE TOTAL ACID NUMBER OF A HYDROCARBON FEED

(75) Inventors: Shabbir Husain, San Pablo, CA (US); Lin Li, Albany, CA (US); Zhen Zhou, Emeryville, CA (US); Alexander E. Kuperman, Orinda, CA (US); Zunqing He, San Rafael, CA (US); Huping Luo, Richmond, CA (US)

(73) Assignee: Chevron U.S.A. Inc.

( * ) Notice: Subject to any disclaimer, the term of this patent is extended or adjusted under 35 U.S.C. 154(b) by 711 days.

(21) Appl. No.: 12/889,715

(22) Filed: Sep. 24, 2010

(65) Prior Publication Data

US 2012/0074042 A1 Mar. 29, 2012

(51) Int. Cl.
*C10G 29/16* (2006.01)
*C10G 29/04* (2006.01)

(52) U.S. Cl.
USPC .......................................................... 208/263

(58) Field of Classification Search
USPC .......................................................... 208/263
See application file for complete search history.

(56) References Cited

U.S. PATENT DOCUMENTS

| | | | |
|---|---|---|---|
| 3,928,533 A | 12/1975 | Beall et al. | |
| 4,102,938 A | 7/1978 | Rao | |
| 4,394,297 A | 7/1983 | Kolts | |
| 4,655,906 A * | 4/1987 | Bjornson et al. | 208/217 |
| 4,693,991 A | 9/1987 | Bjornson et al. | |
| 5,164,073 A | 11/1992 | Lam | |
| 5,164,497 A | 11/1992 | King et al. | |
| 5,242,881 A | 9/1993 | Tang et al. | |
| 5,371,055 A | 12/1994 | Cormier et al. | |
| 5,801,115 A | 9/1998 | Albers et al. | |
| 5,910,242 A | 6/1999 | Halbert et al. | |
| 6,338,794 B1 | 1/2002 | Khare | |
| 2004/0026299 A1 | 2/2004 | Pravia et al. | |
| 2004/0087809 A1 | 5/2004 | Nakayama et al. | |
| 2004/0149628 A1 | 8/2004 | Ou et al. | |
| 2005/0098478 A1 | 5/2005 | Gupta et al. | |
| 2007/0010682 A1 | 1/2007 | Myllyoja et al. | |
| 2007/0282119 A1 | 12/2007 | Matson et al. | |
| 2008/0071125 A1 | 3/2008 | Li | |
| 2009/0000185 A1 | 1/2009 | Aulich et al. | |
| 2009/0041646 A1 | 2/2009 | Ikeda et al. | |
| 2009/0305872 A1 | 12/2009 | Stamires et al. | |
| 2011/0237854 A1 | 9/2011 | Heil et al. | |

FOREIGN PATENT DOCUMENTS

| | | |
|---|---|---|
| GB | 485123 | 5/1938 |
| WO | 2007/141293 | 12/2007 |
| WO | 2008/058664 | 5/2008 |
| WO | WO2010/043765 | 4/2010 |
| WO | WO2010/136783 | 12/2010 |
| WO | WO2011/012439 | 2/2011 |

OTHER PUBLICATIONS

K. Jothimurugesan and S. K. Gangwal, Regeneration of Zinc Titanate H2S Sorbents, 37 Ind. Eng. Chem. Res. 1929-1933 (1998).*
PCT International Search Report and Written Opinion, International Application No. PCT/US2011/047202, dated Mar. 27, 2012, pp. 1-11.
U.S. Appl. No. 12/873,113, filed Aug. 31, 2011, Zhou, et al.
Juliana Pereira Silva, et al., Characterization of commercial ceramic adsorbents and its application on naphthenic acids removal of petroleum distillates, Mat. Res. vol. 10 No. 2 Apr./Jun. 2007.
Aihua Zhang, et al., Improved Processes to Remove Naphthenic Acids, Annual Technical Progress Report, From Oct. 2002-Sep. 2003, California Institute of Technology.
Zhenzbong Wen, et al., Biodiesel production from waste cooling oil catalyzed by TiO2-MgO mixed oxides, Bioresourece Technology, vol. 101, Aug. 8, 2010, XP-002718116.
Arumugam Sivasatny et al., Catalytic applications in the production of biodiesel from vegetable oils, Chemsuschem, vol. 2. Dec. 31, 2009, pp. 278-300, XP2718117.
Euiopearn Search Report, mail date Mar. 14, 2014, 6 pages.

* cited by examiner

*Primary Examiner* — Randy Boyer
(74) *Attorney, Agent, or Firm* — Karen D. DiDomenicis; Richard J. Schulte

(57) ABSTRACT

Disclosed are embodiments relating to a process for reducing the total acid number of a hydrocarbon feed by contacting the feed with a metal titanate catalyst having an MTiO$_3$ structure wherein M is a metal having a valence of 2+, resulting in a hydrocarbon product having a final total acid number lower than the initial total acid number of the feed. The process is useful for pretreating high acid crudes prior to further processing thus avoiding corrosion of equipment used in refining operations. The process can be integrated into conventional refining operations in order to treat various refinery streams. In one embodiment, a process is provided for refining a low acid crude oil and a high acid crude oil by separately introducing a relatively low acid crude oil feed and a relatively high acid crude oil feed to an atmospheric distillation column, wherein the relatively high acid crude oil feed is contacted with a metal titanate catalyst prior to introduction to the atmospheric distillation column.

28 Claims, 3 Drawing Sheets

PROCESS FOR REDUCING THE TOTAL ACID NUMBER OF A HYDROCARBON FEED

FIELD

The present disclosure is directed generally to a process for reducing the total acid number of a liquid hydrocarbon feed by contacting the feed with a catalyst.

BACKGROUND

High acid crude oil ("HAC") can cause corrosion of equipment utilized in refining operations, resulting in higher operating expenses involved in maintaining equipment and refinery shutdowns due to equipment failure. The corrosion is generally attributed to the high concentration of naphthenic acids and other acidic species in the crude oil. Naphthenic acids are found in various crudes, such as, for example, crudes from California, Venezuela, North Sea, Western Africa, India, China and Russia. Chemical reactions to reduce total acid number (TAN) of crude oil have been investigated. Such TAN reduction technologies can be divided into the categories of hydrotreating, chemical neutralization, esterification, amidation and decarboxylation. It would be desirable to have a process by which a liquid hydrocarbon feed, such as, for example, a high acid crude, could be rendered less corrosive to processing equipment.

SUMMARY

One embodiment relates to a process for reducing the total acid number of a liquid hydrocarbon feed by contacting the feed having an initial total acid number of at least 0.5 mg/g KOH with a catalyst comprising a metal titanate having an $MTiO_3$ structure, wherein M is a metal having a valence of 2+ at a temperature of between 200° C. and 400° C., thereby resulting in a treated hydrocarbon product having a final total acid number at least 10% lower than the initial total acid number.

Another embodiment relates to a process for refining a low acid crude oil and a high acid crude oil comprising separately introducing a relatively low acid crude oil feed and a relatively high acid crude oil feed to an atmospheric distillation column, wherein the relatively high acid crude oil feed is contacted with a catalyst comprising a metal titanate having an $MTiO_3$ structure, wherein M is a metal having a valence of 2+ prior to introduction to the atmospheric distillation column.

DETAILED DESCRIPTION

The following terms will be used throughout the specification and will have the following meanings unless otherwise indicated.

"Hydrocarbon feed" refers to a feed that includes hydrocarbons. Hydrocarbon feed may include, but is not limited to, crude oil, synthetic crude, distillate products, straight run feed, atmospheric and vacuum bottoms, vacuum gas oil, biologically derived oils, or mixtures thereof.

"Naphthenic acid" (NA) refers to the carboxylic acid content of a sample of hydrocarbon feed including but not limited to alkyl substituted acyclics, fatty acids, aromatic acids, carbazoles and isoprenoid acids. Examples in certain crude oils include complex acid structures with two, three or four carboxylic groups (tetrameric acids as well as structures containing heteroatoms, e.g., sulfur, oxygen, and nitrogen).

"Total acid number" (TAN) refers to the amount of KOH in milligrams required to neutralize one gram sample of hydrocarbon feed. TAN is determined by ASTM Method D664.

The present disclosure provides embodiments for reducing the total acid number, also referred to as TAN, of a hydrocarbon feed.

In some embodiments, a process for reducing the total acid number of a hydrocarbon feed includes contacting the hydrocarbon feed with a metal titanate catalyst within a suitable reactor. In some embodiments, the feed is passed over the catalyst in a fixed bed reactor operating in continuous mode. A single catalyst bed or multiple catalyst beds may be used. In another embodiment, the feed is passed over a monolithic catalyst in a reactor operating in continuous mode. In another embodiment, the feed contacts the catalyst in a slurry bed reactor in continuous mode. Either an upflow or downflow type reactor can be used. The feed can also be contacted with the catalyst in a batch reactor. In one embodiment, the process is for treating high acid crude oils before reaching FCC (fluid catalytic cracking) or hydroprocessing units located downstream.

Figure 1:
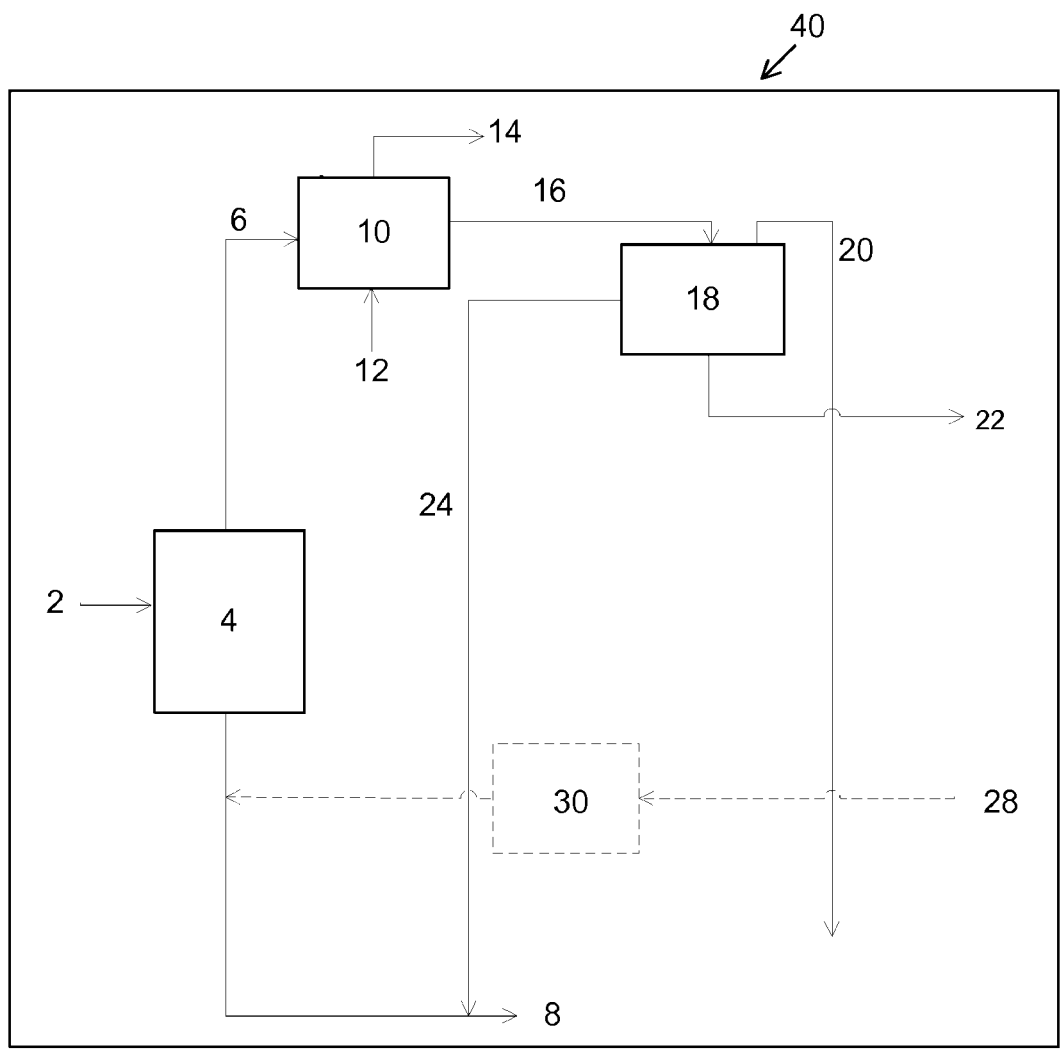
FIG. 1 is a block flow diagram illustrating a total acid number reduction unit utilizing a catalyst comprising a metal titanate having an $MTiO_3$ structure.

In one embodiment, illustrated in FIG. 1, a hydrocarbon feed 2 is fed to a fixed bed reactor 4 containing a bed of catalyst comprising a metal titanate having an $MTiO_3$ structure. The reactor 4 is a component within the total acid number reduction unit 40. Treated, low acid crude stream 8 is removed from the reactor for further processing as desired. Gas stream 6 containing various components including, but not limited to, carbon dioxide, methane, carbon monoxide, water vapor and light hydrocarbons is removed from the reactor and passes through condenser 10 utilizing incoming cooling water 12. Cooling water 14 is removed from the condenser. Mixed stream 16 is sent to three-phase separator 18. Gas stream 20 is removed from the separator and processed. Water 22 is removed from the separator. Light ends stream 24 is removed from the separator and can be combined with treated, low acid crude stream 8.

In one embodiment, the metal titanate catalyst bed can optionally be subjected to the flow of a stripping gas stream 28, which can be, for example, refinery gas or associated gas, depending on the location and application of the total acid number reduction unit. The stripping gas can also be an inert gas, e.g. nitrogen, for example. A blower or compressor 30 can be used to feed optional low pressure stripping gas stream 28 to the reactor. This gas stream serves to strip carbon dioxide, water vapor and other light gases from the reactor 4. In one embodiment, the flow of gas is countercurrent to the flow of the hydrocarbon feed. In one embodiment, the flow of gas is between 50 and 200 scf/bbl (standard cubic feet of gas per barrel of hydrocarbon feed).

In one embodiment, the temperature of the process within reactor 4 is less than 400° C.; in another embodiment the temperature is from 200° C. to 350° C. It is desirable to minimize cracking of the liquid hydrocarbon feed by running the process at mild conditions, such as a temperature less than about 400° C. The pressure within the reactor can be between 30 psi (210 kPa) and 100 psi (690 kPa). All pressures indicated herein are absolute. In another embodiment, the pressure can be below 30 psi, although depending on the pressure in the surrounding equipment, it may be necessary to pump the stream exiting the reactor to a higher pressure. In one embodiment, the LHSV is between 0.1 and $10^{-1}$; in another embodiment, the LHSV is between 0.2 and 5.0 $h^{-1}$; in another embodiment, the LHSV is between 0.4 and 2.0 $h^{-1}$. LHSV refers to the volumetric liquid feed rate per total volume of catalyst and is expressed as the inverse of hours ($h^{-1}$).

In one embodiment, the reaction is conducted in the absence of added hydrogen. In one embodiment, hydrogen gas introduced to the reactor is such that the mole ratio of hydrogen to hydrocarbon feed is less than 0.1.

Catalysts suitable for use in the embodiments described herein include metal titanates, also referred to herein interchangeably as titanates, which can be expressed as $MTiO_3$ wherein M is a metal having a valence of 2+. The metal M may also be capable of multiple valences. In one embodiment, the catalyst consists essentially of at least a metal titanate of the formula $MTiO_3$. In another embodiment, the catalyst contains a mixture of a metal titanate with at least a metal oxide, with both basic and acid properties. In one embodiment, the catalyst consists essentially of at least a metal titanate with at least a basic oxide. In one embodiment, the molar ratio of metal titanate to metal oxide ranges from 1:10 to 10:1. In a second embodiment, the molar ratio ranges from 1:5 to 5:1. In a third embodiment, the ratio ranges from 1:2 to 2:1.

Pure metal titanates have a perovskite crystalline structure. The catalyst can contain at least 80% by weight titanate. In another embodiment, the catalyst contains at least 1% by weight titanate; in another embodiment at least 5% by weight titanate; in another embodiment at least 10% by weight titanate based on the total weight of the catalyst, including any other desirable active components as well as optional support material. The actual amount of titanate needed will vary depending on whether or not a support is used, and how the catalyst is dispersed on the support. Examples of suitable metal titanates for use in the catalyst include, but are not limited to, magnesium titanate, copper titanate, nickel titanate, iron(II) titanium oxide, cobalt titanium oxide, manganese (II) titanium oxide, lead(II) titanate, calcium titanate, barium titanate, zinc titanate, and mixtures thereof. Examples of basic (metal) oxides include, but are not limited to calcium oxide, magnesium oxide, magnesium aluminum oxide, zinc oxide, lanthanum oxide, cerium oxide, barium oxide and mixtures thereof.

In one embodiment, the catalyst has a BET surface area greater than 20 $m^2/g$; in another embodiment the BET surface area is greater than 200 $m^2/g$; in yet another embodiment the BET surface area is greater than 400 $m^2/g$.

In one embodiment, the catalyst is a supported catalyst. Suitable support materials include silica, alumina, silica-alumina, carbon, molecular sieves and mixtures thereof. In one embodiment, the catalyst is deposited on a carbon support having a BET surface area of between 500 $m^2/g$ and 1500 $m^2/g$. In another embodiment, the catalyst is deposited on a support selected from silica, alumina, silica-alumina and mixtures thereof, and the support has a BET surface area of between 150 $m^2/g$ and 600 $m^2/g$. In one embodiment, the catalyst is shaped as a monolith. Alternatively, the catalyst can be unsupported.

Examples of suitable liquid hydrocarbon feeds include, but are not limited to, crude oil, synthetic crude oil, straight run feed, distillate products, atmospheric and vacuum bottoms, vacuum gas oil and biologically derived oils having an initial total acid number of at least 0.5 mg/g KOH. In some embodiments, the liquid hydrocarbon feed is a high acid crude, i.e. crude oil having a TAN of at least 0.5 mg/g KOH. In one embodiment, the TAN of high acid crude feeds can be reduced significantly, allowing high acid crude to be treated prior to downstream processing in refineries. The TAN can be reduced by various amounts. In one embodiment, the final TAN of the treated hydrocarbon product is at least 10% lower than the initial TAN of the liquid hydrocarbon feed; in a second embodiment, the final TAN is at least 50% lower than the initial TAN; in a third embodiment, the final TAN is at least 90% lower than the initial TAN. The actual reduction will depend on the particular feed and the desired TAN of the treated hydrocarbon product. In one embodiment wherein the feed is a high acid crude having a TAN of at least 10 mg/g KOH, the treated crude has a TAN of less than 5 mg/g KOH. In a second embodiment wherein the feed is a high acid crude feed having a TAN of at least 20 mg/g KOH, the TAN reduction is at least 50% resulting in a treated crude with a TAN of 10 or less.

Figure 2:
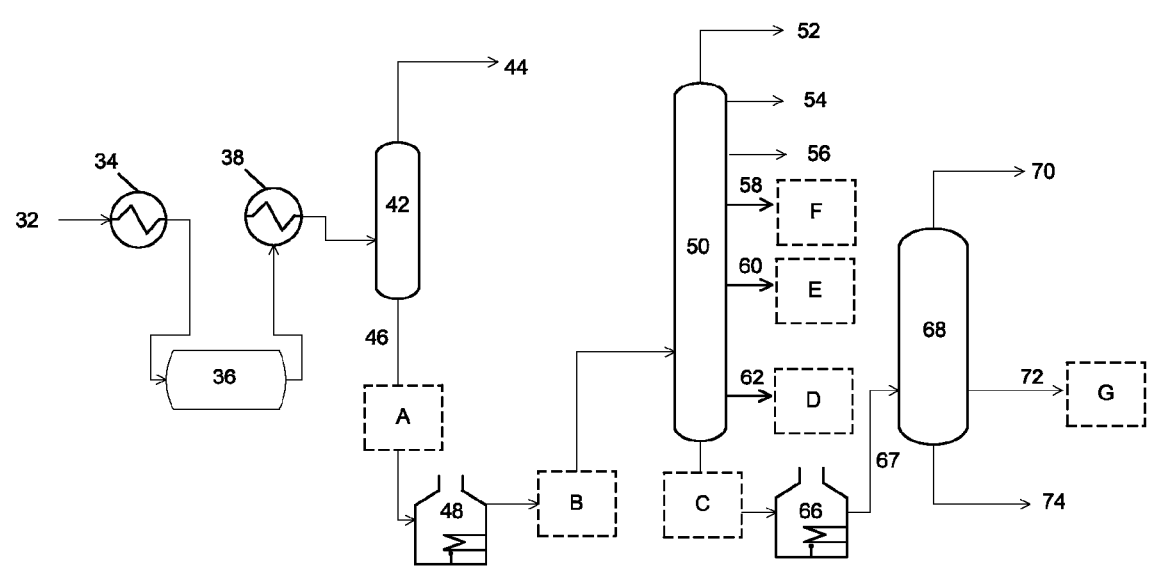
FIG. 2 is a process flow diagram illustrating a process for refining a crude oil feed illustrating various alternative locations at which a total acid number reduction unit can be utilized to treat various streams within the process scheme.

A refining operation is illustrated in FIG. 2. Crude oil feed 32, which can be a high acid crude or a blend of multiple crudes, is initially routed through heat exchanger 34, desalter 36 and second heat exchanger 38 prior to separation in flash drum 42. Light fraction 44 is separated overhead, and heavy fraction 46 is passed to fired heater 48 prior to being introduced to atmospheric distillation column 50. Various fractions 52, 54, 56, 58, 60 and 62 are removed from distillation column 50. Vacuum column 68 is used to treat the atmospheric distillation residue 67, thus producing vacuum overhead stream 70, multiple cuts of vacuum gas oil stream 72 and vacuum residual stream 74.

The TAN reduction unit 40 as previously described can be utilized to treat various streams within a crude refining operation. The process is useful for pretreating high acid crudes prior to further processing thus avoiding corrosion of equipment used in refining operations. The TAN reduction unit can be located to treat any refinery stream, such as those locations indicated in FIG. 2 by the letters A through G. For example, in one embodiment, a TAN reduction unit at location A is used to treat stream 46 prior to entering heater 48, thus protecting the heater from corrosion. Alternatively, in another embodiment, a TAN reduction unit 40 at location B can be used to treat the stream exiting heater 48. A TAN reduction unit can be located at location C in order to treat the atmospheric distillation residue from distillation column 50 prior to entering heater 66. Where isolation of the desalting and heating train cannot be accomplished, this reduces the overall quantity of crude that must be processed through the TAN reduction unit. A TAN reduction unit can be located at location D in order to treat the atmospheric gas oil fraction 62. A TAN reduction unit can be located at location E in order to treat the diesel fraction 60. A TAN reduction unit can be located at location F in order to treat kerosene fraction 58. A TAN reduction unit can be located at location G in order to treat vacuum gas oil fraction 72, which is a petroleum fraction where acids are known to concentrate. While each of these locations indicated by letters A through G represents separate possible embodiments, a TAN reduction unit can be located at multiple of these locations.

Figure 3:
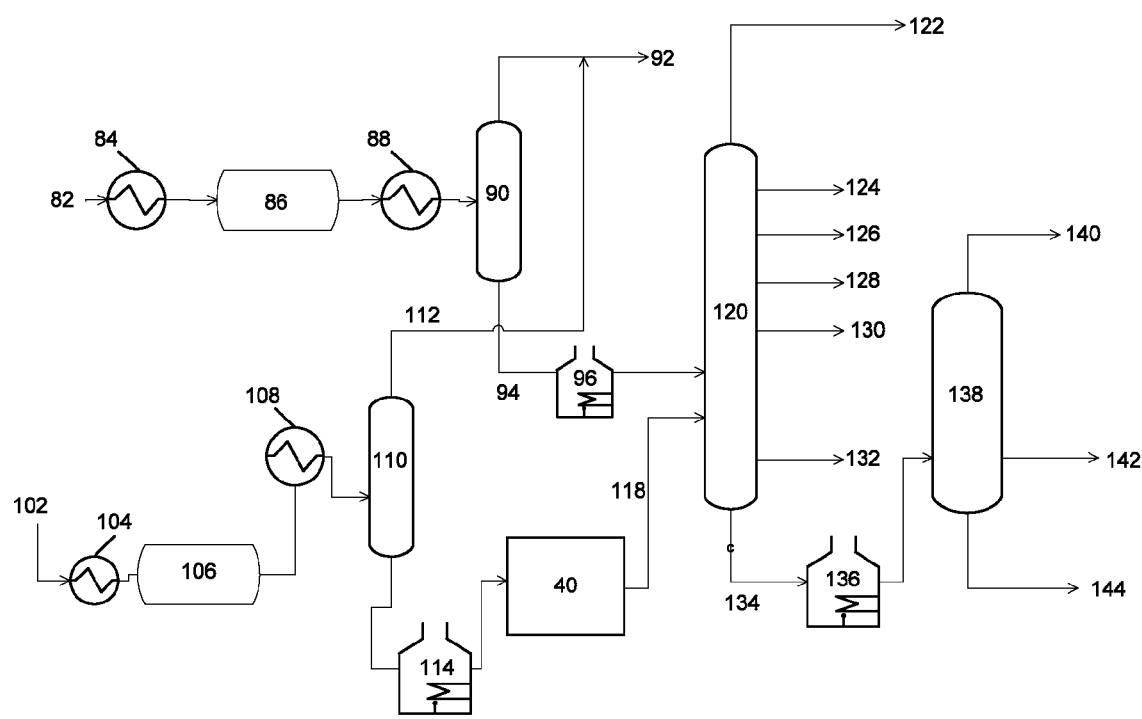
FIG. 3 is a process flow diagram illustrating a process scheme in which a relatively low acid crude and a high acid crude are fed to an atmospheric distillation column and a total acid number reduction unit is utilized to treat the high acid crude.

FIG. 3 illustrates one embodiment in which a relatively low acid crude oil feed 82 and a relatively high acid crude oil feed 102 are separately fed to a refining operation. Each feed is heated through a heat exchanger (84 and 104, respectively), passes a desalter (86 and 106), a second heat exchanger (88 and 108), a flash drum (90 and 110) and a heater (96 and 114)

prior to each stream being introduced to atmospheric distillation column 120. Relatively high acid crude 102 passes through a total acid number reduction unit 40 prior to being introduced to the distillation column 20. Various fractions 122, 124, 126, 128, 130, 132 and 134 are taken off the distillation column. Atmospheric distillation residue 134 is sent to heater 136 and vacuum column 138 from which fractions 140, 142 and 144 are taken off. In this embodiment, the equipment for the high acid crude feeds can be isolated from the equipment for the low acid crude. This configuration minimizes the size of the reaction column and quantity of catalyst required in the total acid number reduction unit 40.

TEST METHODS

Catalyst surface area was determined by $N_2$ adsorption at its boiling temperature. BET surface area was calculated by the 5-point method at $P/P_0$=0.050, 0.088, 0.125, 0.163, and 0.200. Catalyst samples were first pre-treated at 400° C. for 6 hours in the presence of flowing, dry $N_2$ so as to eliminate any adsorbed volatiles like water or organics.

Total acid number (TAN) was determined according to ASTM D664.

EXAMPLES

The catalyst/feed combinations listed in Table 1 were initially tested in a batch process using approximately 5 wt. % catalyst with respect to the experimental feed. A CaO—CaTiO3 (3:1 mole ratio) catalyst mixture was prepared by a thermal spray method from inorganic precursors and calcined at 750° C. for 2 hours in air. A 50 ml round bottom flask equipped with a glass coated magnetic stirrer was used. The flask was heated using a heating mantle, and a condenser (using dry ice) was used to minimize evaporative losses. A nitrogen gas sweep (approximately 50 ml/min) was used to carry any $CO_2$ and water vapor formed from the flask. The experiments were run using approximately 5 wt. % catalyst with respect to the experimental high acid feed. The experimental feed was made by mixing crude oil derived naphthenic acids (obtained from Merichem Company, Houston, Tex.) with a naphthenic white oil (HR Tufflo 1200, obtained from Calumet Specialty Products Partners L.P., Indianapolis, Ind.). Catalytic activity was measured at the end of the reaction with TAN measurements. The catalysts and experimental feed were heated to 150° C. and held for two hours, followed by heating to 200° C. and holding for two hours, followed by heating to 300° C. and holding for two hours.

TABLE 1

| Catalyst | TAN of feed (mg/g KOH) | TAN of treated stream (mg/g KOH) | TAN reduction (%) |
|---|---|---|---|
| Control (no catalyst) | 20 | 17.5 | 13 |
| CaO—CaTi03 | 20 | 9.3 | 54 |
| CaO—CaTi03 | 10 | 4.7 | 53 |

The following catalysts were obtained from Sigma-Aldrich Corp. (St. Louis, Mo.): barium titanate (product number 467634, >=99% purity), calcium titanate (product number 633801, 99.9% purity) and zinc titanate (product number 634409, 99.5% purity). These catalysts were tested in a continuous experimental set up using a packed tube reactor heated by a clamshell furnace. The experimental feed and nitrogen stripping gas were fed co-currently at the bottom of the reactor. The mixed gas and liquid stream exiting the reactor was separated in a knock-out (KO) pot. A back pressure regulator at the gas stream exit of the knock-out pot was used to regulate the reactor and KO pot pressure. The gas stream from the knock-out pot was passed through a desiccant (available from W. A. Hammond DRIERITE Co. LTD, Xenia, Ohio) to remove water before passing through an infra-red $CO_2$ analyzer (available from Qubits Systems, Kingston, Ontario) to measure the presence of $CO_2$. Liquid samples were drained from the knock-out pot at the end of the run. The effect of temperature on TAN reduction is shown for a liquid hourly space velocity (LHSV) of 1.6 $hr^{-1}$ and a stripping gas ($N_2$) superficial gas velocity (SGV) of 33 cm/min in Table 2. Both TAN reduction and $CO_2$ evolution are strong functions of temperature, as can be seen.

TABLE 2

| Catalyst | Temperature (° C.) | TAN reduction (%) | $CO_2$:acid mole ratio (%) |
|---|---|---|---|
| BaTiO3 | 250 | 10 | 1 |
| BaTiO3 | 300 | 16 | 15 |
| BaTiO3 | 350 | 53 | 52 |
| CaTiO3 | 300 | 18 | 20 |
| ZnTiO3 | 300 | 11 | 35 |

The effect of residence time on TAN reduction at a temperature of 350° C. and stripping gas ($N_2$) superficial gas velocity of 33 cm/min is shown in Table 3. The results indicate a strong effect of LHSV on TAN reduction.

TABLE 3

| Catalyst | LHSV ($hr^{-1}$) | TAN reduction (%) |
|---|---|---|
| ZnTiO3 | 0.40 | 92 |
| ZnTiO3 | 0.79 | 50 |
| ZnTiO3 | 1.57 | 53 |
| BaTiO3 | 0.79 | 50 |
| BaTiO3 | 1.57 | 53 |

Albacora crude was used to test the response of the catalysts ($ZnTiO_3$ product number 634409, supplied by Sigma-Aldrich Corp.) on real crude feeds. Albacora is a Brazilian high acid crude with a TAN of 1.88 mg/g KOH. The experiments were run at ambient pressure and stripping gas ($N_2$) SGV of 25 cm/min with 1 mm diameter borosilicate glass beads used as a control to isolate the effects of temperature on TAN reduction. As shown in Table 4, the experimental data suggests that the titanate is very effective in reducing the TAN of Albacora crude versus the control case using borosilicate glass beads.

TABLE 4

| Crude | Catalyst | Reactor Temp (° C.) | LHSV ($hr^{-1}$) | % Acid Reduction |
|---|---|---|---|---|
| Albacora | ZnTiO3 | 323 | 1.61 | 26% |
| Albacora | ZnTiO3 | 325 | 0.40 | 42% |
| Albacora | ZnTiO3 | 328 | 1.61 | 28% |
| Albacora | ZnTiO3 | 329 | 0.40 | 60% |
| Albacora | ZnTiO3 | 376 | 0.40 | 85% |
| Albacora | ZnTiO3 | 377 | 1.61 | 81% |
| Albacora | ZnTiO3 | 381 | 0.40 | 86% |
| Albacora | ZnTiO3 | 382 | 1.61 | 88% |
| Albacora | Borosilicate | 327 | 1.16 | 7% |

TABLE 4-continued

| Crude | Catalyst | Reactor Temp (° C.) | LHSV (hr⁻¹) | % Acid Reduction |
|---|---|---|---|---|
| Albacora | Borosilicate beads | 328 | 0.29 | 21% |
| Albacora | Borosilicate beads | 385 | 1.16 | 23% |
| Albacora | Borosilicate beads | 385 | 0.29 | 35% |

The particular embodiments disclosed above are illustrative only, and may be modified and practiced in different but equivalent manners apparent to those skilled in the art having the benefit of the teachings herein. Furthermore, no limitations are intended to the details of construction or design herein shown, other than as described in the claims below.

What is claimed is:

1. A process for reducing the total acid number of a liquid hydrocarbon feed, comprising contacting, without the addition of hydrogen gas, a liquid hydrocarbon feed having an initial total acid number of at least 0.5 mg/g KOH with a catalyst comprising a metal titanate having an $MTiO_3$ structure, wherein M is a metal having a valence of 2+ at a temperature of between 200° C. and 400° C., thereby resulting in a treated hydrocarbon product having a final total acid number at least 10% lower than the initial total acid number.

2. The process of claim 1, wherein the catalyst further comprises a metal oxide.

3. The process of claim 1, wherein the final total acid number is at least 50% lower than the initial total acid number.

4. The process of claim 1, wherein the final total acid number is at least 90% lower than the initial total acid number.

5. The process of claim 1, wherein the catalyst comprises at least 1% by weight metal titanate.

6. The process of claim 1, wherein the catalyst comprises at least 5% by weight metal titanate.

7. The process of claim 1, wherein the catalyst comprises at least 10% by weight metal titanate.

8. The process of claim 1, wherein the catalyst comprises at least 80% by weight metal titanate.

9. The process of claim 1, wherein the catalyst consists essentially of a metal titanate having an $MTiO_3$ structure, with M being a metal having a valence of 2+.

10. The process of claim 9, wherein the catalyst consists essentially of a basic oxide and a metal titanate having an $MTiO_3$ structure, with M being a metal having a valence of 2+, wherein the molar ratio of the basic oxide to the metal titanate ranges from 1:10 to 10:1.

11. The process of claim 10, wherein the basic oxide is selected from the group of calcium oxide, magnesium oxide, magnesium aluminum oxide, zinc oxide, lanthanum oxide, cerium oxide, barium oxide and mixtures thereof.

12. The process of claim 1, wherein the catalyst further comprises a support selected from the group consisting of silica, alumina, silica-alumina, carbon, molecular sieves and mixtures thereof.

13. The process of claim 1, wherein the hydrocarbon feed is contacted with the catalyst at a temperature of between 200° C. and 350° C.

14. The process of claim 1, wherein the catalyst comprises a metal titanate selected from the group consisting of magnesium titanate, copper titanate, nickel titanate, iron(II) titanium oxide, cobalt titanium oxide, manganese(II) titanium oxide, lead(II) titanate, calcium titanate, barium titanate and zinc titanate.

15. The process of claim 1, wherein the catalyst comprises a metal titanate selected from the group consisting of calcium titanate, barium titanate and zinc titanate.

16. The process of claim 1, wherein the catalyst consists essentially of a metal titanate selected from the group consisting of magnesium titanate, copper titanate, nickel titanate, iron(II) titanium oxide, cobalt titanium oxide, manganese(II) titanium oxide, lead(II) titanate, calcium titanate, barium titanate and zinc titanate.

17. The process of claim 1, wherein the hydrocarbon feed is contacted with the catalyst at a LHSV of between 0.1 and 10 $h^{-1}$.

18. The process of claim 1, wherein the hydrocarbon feed is contacted with the catalyst at a LHSV of between 0.4 and 2 $h^{-1}$.

19. The process of claim 1, wherein the hydrocarbon feed is contacted with the catalyst in a fixed bed reactor.

20. The process of claim 1, wherein the hydrocarbon feed is contacted with the catalyst in a slurry bed reactor.

21. The process of claim 1, wherein the hydrocarbon feed is selected from the group consisting of crude oil, synthetic crude, distillate products, straight run feed, atmospheric and vacuum bottoms, vacuum gas oil and biologically derived oils.

22. The process of claim 1, further comprising introducing a stripping gas stream capable of degassing the reactor contents.

23. The process of claim 1, wherein the treated hydrocarbon product is used as feed for an atmospheric distillation process.

24. The process of claim 1, wherein the treated hydrocarbon product is used as feed for a downstream FCC unit.

25. The process of claim 1, wherein the treated hydrocarbon product is used as feed for a downstream hydroprocessing unit.

26. The process of claim 1, wherein the liquid hydrocarbon feed has an initial acid number of at least 10 mg/g KOH and wherein the final total acid number is at least 50% lower than the initial total acid number.

27. The process of claim 1, wherein the metal titanate has a perovskite structure.

28. A process for refining a low acid crude oil and a high acid crude oil comprising separately introducing a relatively low acid crude oil feed and a relatively high acid crude oil feed to an atmospheric distillation column, wherein the relatively high acid crude oil feed is contacted, without the addition of hydrogen gas, with a catalyst comprising a metal titanate having an $MTiO_3$ structure, wherein M is a metal having a valence of 2+ prior to introduction to the atmospheric distillation column.

* * * * *